United States Patent
Choi et al.

(10) Patent No.: US 7,097,706 B2
(45) Date of Patent: Aug. 29, 2006

(54) NON-HEATING CLAY COMPOSITES FOR BUILDING MATERIALS

(75) Inventors: Hee-Yong Choi, Daejeon (KR); Hey-Zoo Hwang, Seoul (KR); Min-Chol Cho, Mokpo (KR); Tae-Sung Park, Mokpo (KR); Yu-Son Chu, Mokpo (KR)

(73) Assignee: G Plus Co., Ltd., Seoul (KR)

( * ) Notice: Subject to any disclaimer, the term of this patent is extended or adjusted under 35 U.S.C. 154(b) by 0 days.

(21) Appl. No.: 10/507,207

(22) PCT Filed: Apr. 14, 2003

(86) PCT No.: PCT/KR03/00754

§ 371 (c)(1),
(2), (4) Date: Sep. 14, 2004

(87) PCT Pub. No.: WO03/089383

PCT Pub. Date: Oct. 30, 2003

(65) Prior Publication Data

US 2005/0164868 A1 Jul. 28, 2005

(30) Foreign Application Priority Data

Apr. 16, 2002 (KR) .................. 10-2002-0020657

(51) Int. Cl.
*C04B 14/10* (2006.01)
(52) U.S. Cl. .................. 106/790; 106/611; 106/612; 106/773; 106/789; 106/791; 106/793; 106/796
(58) Field of Classification Search ................ 106/789, 106/790, 791, 611, 612, 773, 793, 796
See application file for complete search history.

(56) References Cited

FOREIGN PATENT DOCUMENTS

| JP | 52-148525 | A | * | 12/1977 |
|----|-----------|---|---|---------|
| JP | 8-48549   | A |   | 2/1996  |
| JP | 8-48549   | A | * | 2/1996  |
| JP | 9-132440  | A | * | 5/1997  |
| JP | 13-48614  | A |   | 2/2001  |
| JP | 2001-48614 | A | * | 2/2001  |
| JP | 13-163656 | A |   | 6/2001  |
| JP | 2001-163656 | A | * | 6/2001 |
| RU | 2133233   | C1 | * | 7/1999 |

OTHER PUBLICATIONS

Derwent Abstract No. 1992-206391, abstract of Soviet Union Patent Specification No. 1662973A1 (Jul. 1991).*
Derwent Abstract No. 2000-348550, abstract of Russian Patent Specification No. 2133233C1 (Jul. 1999).*
Derwent Abstract No. 2002-600678, abstract of Chinese Patent Specification No. 1355147A (Jun. 1992).*
Derwent Abstract No. 2002-605387, abstract of Korean Patent Specification No. 2002018635A (Mar. 2002).*

* cited by examiner

*Primary Examiner*—Anthony J. Green
(74) *Attorney, Agent, or Firm*—Arent Fox PLLC

(57) ABSTRACT

The object of this invention is to provide a non-calcined clay composite used as building materials capable of promoting humans' health and being desirably used irrespective of location, which is improved in terms of strength without calcining clay. Because the non-calcined clay composite is produced without calcining clay, the process of producing it is simplified and its productivity is improved. The non-calcined clay composite includes 50 to 90 wt % clay, 2 to 30 wt % lime, 4 to 48 wt % blast furnace slag, 0.04 to 0.9 wt % alkaline chemical, and water as a balance, and has high compression strength due to an ionic coagulation reaction, a pozzolan reaction, and a latent hydraulic reaction.

2 Claims, No Drawings

NON-HEATING CLAY COMPOSITES FOR BUILDING MATERIALS

CROSS-REFERENCE TO RELATED APPLICATION

This application is a National Stage entry of International Application No. PCT/KR03/00754, filed Apr. 14, 2003, the entire specification and claims of which are incorporated herewith by reference.

TECHNICAL FIELD

The present invention relates, in general, to a non-calcined clay composite and, in particular, to a non-calcined clay composite mostly consisting of clay, lime, blast furnace slag, and an alkaline chemical, which has desirable strength and is not easily softened even though the clay is not calcined.

BACKGROUND ART

As well known to those skilled in the art, mortar, "cement mortar", consists of cement kneaded with water, and is often used as finishing materials of walls, floors, and ceilings. Furthermore, mortar is a relatively low-priced material, has desirable strength, fire resistance, water resistance, and durability, and is easily handled. Hence, mortar is being widely applied in various construction applications. Additionally, mortar is used to settle a masonry structure and as a plaster joint or plastering material. Thus, it must be used while its amount is controlled in a surface finishing process unlike concrete.

However, such mortar having excellent physical properties and frequently used as building materials, particularly, interior materials emits harmful substances capable of injuring dweller's health. Hence, in accordance with the recent trend of an increased interest in health, a study is being conducted to develop a composite capable of replacing such mortar, and for example, a study to replace mortar with clay becomes a prominent figure.

The clay consists of fine earth particles with a diameter of 0.004 mm or smaller, and is an aggregation including natural granules having plasticity when it absorbs moisture and having strength when dry. Additionally, the clay is apt to be sintered when being calcined at a predetermined temperature, and has a multi-layered honeycomb structure with large surface area. Further, far infrared rays are absorbed and stored in the pores of the honeycomb structure having a similar shape to a sponge, and when being heated, the clay emits the far infrared rays to stimulate molecular movement of a subjective material. Furthermore, a tea spoon of clay particles contains about two hundred million microorganisms, causing various enzyme reactions.

As described above, the clay emits far infrared rays contributing to activating physiological functions of cells and having a photoelectric effect which removes harmful substances from the cells using heat energy.

The clay has been typically used as building materials for walls or floors of buildings, finishing materials of interior and exterior parts of the buildings, and materials of tiled roofs. However, the clay has poor strength, water resistance, water tightness, and durability, thus being limitedly used as fireproof materials or calcined clay after being calcined. In other words, the clay is calcined to produce ceramic products with a desirable strength, and the ceramic products are used as the building materials and ceramic materials.

In the process of calcining the clay, a structure of the clay is melted by heat (traditionally, 1000° C. or higher) and converted into a hard glassy material, thereby preventing the clay from softening and allowing the clay to have predetermined strength. However, the process of calcining the clay is disadvantageous in that calcining the clay requires a high temperature which requires a lot of energy. Thus, there is the emitting of harmful pollutants due to the combustion of fuels which causes serious environmental pollution.

Additionally, when the clay is calcined so as to obtain a clay composite with desirable strength, the process of producing the clay composite is complicated, and the production time and cost of the clay composite are undesirably increased.

DISCLOSURE OF THE INVENTION

Accordingly, the present invention has been made keeping in mind the above problems occurring in the prior art, and an object of the present invention is to provide a non-calcined clay composite used as building materials capable of promoting humans' health and being desirably used irrespective of location, which is improved in terms of strength without calcining clay. Because the non-calcined clay composite is produced without calcining the clay, the process of producing it is simplified and its productivity is improved.

In order to accomplish the above object, the present invention provides a non-calcined clay composite, consisting of 50 to 90 wt % clay, 2 to 30 wt % lime, 4 to 48 wt % blast furnace slag, 0.04 to 0.9 wt % alkaline chemical, and water as a balance, and having high compression strength due to an ionic coagulation reaction, a pozzolan reaction, and a latent hydraulic reaction.

BEST MODE FOR CARRYING OUT THE INVENTION

According to the present invention, when clay, lime, and blast furnace slag are mixed with each other in an appropriate proportion to produce a clay composite, the clay composite has desirable strength and is not easily softened due to an ionic coagulation and a pozzolan reaction of the clay and lime, and a latent hydraulic reaction of the blast furnace slag even though the clay is not calcined.

The clay includes activated soil and calcined soil produced by drying general soil such as primary clay (residual clay), secondary clay (transported clay), mud, yellow earth, and kaoline at high temperature, and reacts with the lime ($Ca(OH)_2$) acting as a reactive additive to cause the ion-exchange and pozzolan reaction. At this time, the clay composite contains the 50 to 90 wt % clay.

The lime ($Ca(OH)_2$) contributes to combining clay particles with each other to improve strength of the clay composite. It is preferable to add the 2 to 30 wt % lime to the clay composite so as to desirably conduct the ion-exchange and pozzolan reaction.

The blast furnace slag is generated during producing pig iron from iron ore in a blast furnace at a relatively high temperature of 1350 to 1550° C., and has latent hydraulic property. In this regard, the clay composite contains the 4 to 48 wt % blast furnace slag.

Alkaline chemical is added to the clay composite so as to promote the latent hydraulic reaction of the blast furnace slag, and selected from the group consisting of NaOH, KOH, slaked lime ($Ca(OH)_2$), $CaSO_4$, NaCl, $CaCl_2$, alum (alumstone), water glass (sodium silicate), and a mixture thereof Preferably, the alkaline chemical is selected from the group consisting of NaOH, slaked lime ($Ca(OH)_2$), $CaCl_2$, and a mixture thereof. At this time, the clay composite contains about 1 to 6 wt % alkaline chemical based on the 100 wt % blast furnace slag. In other words, a content of the alkaline chemical in the clay composite is 0.04 to 0.9 wt %.

When the clay, lime, blast furnace slag, and alkaline chemical are mixed with each other in an appropriate proportion, $Na^+$, $K^+$, and $Mg^{2+}$ adsorbed in surfaces of clay particles are substituted by the calcium ions ($Ca^{2+}$) of the lime, and the ionic coagulation reaction occurs in which the clay particles are combined with each other by the lime added to the clay composite in a larger amount than consumed in the ion exchange procedure. In other words, the clay particles are combined with each other by the ionic coagulation reaction.

Further, while the clay composite is aged after the ionic coagulation reaction, the amount of colloid silica and colloid alumina emitted from the clay is increased and colloid silica and colloid alumina react with the calcium ions ($Ca^{2+}$) of the lime to produce a compound acting as a combining agent. The compound thus produced functions to solidify the clay composite, thereby strength and durability of the clay composite are improved.

Furthermore, the blast furnace slag has a latent hydraulic property that it is hardened by water in alkaline environment. Therefore, it is hardened in water by adding the alkaline chemical to the clay composite, thereby strength of the clay composite is improved.

In other words, the clay composite of the present invention mostly consisting of the clay, lime, and blast furnace slag is very strong and not easily softened by the ionic coagulation and pozzolan reaction of the clay and lime, and latent hydraulic property of the blast furnace slag under the alkaline environment without calcining the clay.

A better understanding of the present invention may be obtained through the following example which is set forth to illustrate, but is not to be construed as the limit of the present invention.

EXAMPLE 1

90 wt % clay, 2 to 6 wt % lime, 4 to 8 wt % blast furnace slag, 0.08 to 0.16 wt % alkaline chemical, and water as a balance were mixed with each other, and aged for 14 days. The resulting mixture was tested for compression strength according to a test method for compression strength of building materials (KS F4002). In this regard, the resulting mixture had relatively high compression strength of 62 to 80 kgf/cm².

EXAMPLE 2

80 wt % clay, 6 to 12 wt % lime, 8 to 14 wt % blast furnace slag, 0.16 to 0.28 wt % alkaline chemical, and water as a balance were mixed with each other. The resulting mixture was tested for compression strength according to the same test method as example 1. In this regard, the resulting mixture had a relatively high compression strength of 98 to 112 kgf/cm².

EXAMPLE 3

70 wt % clay, 6 to 14 wt % lime, 16 to 24 wt % blast furnace slag, 0.32 to 0.48 wt % alkaline chemical, and water as a balance were mixed with each other. The resulting mixture was tested for compression strength according to the same test method as example 1. In this regard, the resulting mixture had a relatively high compression strength of 188 to 234 kgf/cm².

EXAMPLE 4

60 wt % clay, 6 to 18 wt % lime, 22 to 34 wt % blast furnace slag, 0.44 to 0.68 wt % alkaline chemical, and water as a balance were mixed with each other. The resulting mixture was tested for compression strength according to the same test method as example 1. In this regard, the resulting mixture had a relatively high compression strength of 255 to 312 kgf/cm².

EXAMPLE 5

50 wt % clay, 6 to 24 wt % lime, 26 to 42 wt % blast furnace slag, 0.52 to 0.84 wt % alkaline chemical, and water as a balance were mixed with each other. The resulting mixture was tested for compression strength according to the same test method as example 1. In this regard, the resulting mixture had a relatively high compression strength of 189 to 412 kgf/cm².

The results of examples 1 to 5 are described in Table 1.

TABLE 1

| Example | [1]Mark | Clay (%) | Lime (%) | [2]Slag (%) | [3]Alkaline (%) | [4]Streng. (kgf/cm²) | [5]Time (day) |
|---|---|---|---|---|---|---|---|
| 1 | A | 90 | 6 | 4 | 0.08 | 80 | 14 |
|   | B | 90 | 4 | 6 | 0.12 | 68 | 14 |
|   | C | 90 | 2 | 8 | 0.16 | 62 | 14 |
| 2 | D | 80 | 12 | 8 | 0.16 | 112 | 14 |
|   | E | 80 | 9 | 11 | 0.22 | 104 | 14 |
|   | F | 80 | 6 | 14 | 0.28 | 98 | 14 |
| 3 | G | 70 | 14 | 16 | 0.32 | 188 | 14 |
|   | H | 70 | 10 | 20 | 0.4 | 212 | 14 |
|   | I | 70 | 6 | 24 | 0.48 | 234 | 14 |
| 4 | J | 60 | 18 | 22 | 0.44 | 255 | 14 |
|   | K | 60 | 12 | 28 | 0.56 | 288 | 14 |
|   | L | 60 | 6 | 34 | 0.68 | 312 | 14 |
| 5 | M | 50 | 24 | 26 | 0.52 | 189 | 14 |
|   | N | 50 | 15 | 35 | 0.7 | 334 | 14 |
|   | O | 50 | 8 | 42 | 0.84 | 412 | 14 |

[1]Mark: sample mark
[2]Slag: blast furnace slag
[3]Alkaline: alkaline chemical
[4]Streng.: compression strength
[5]Time: aging time

COMPARATIVE EXAMPLE 1

90 wt % clay, 6 wt % lime, and water as a balance were mixed with each other, and aged for 14 days. The resulting mixture was tested for compression strength according to the same test method as example 1. In this regard, the resulting mixture had a compression strength of 45 kgf/cm².

COMPARATIVE EXAMPLE 2

90 wt % clay, 4 wt % blast furnace slag, 0.16 wt % alkaline chemical, and water as a balance were mixed with each other, and aged for 14 days. The resulting mixture was tested for compression strength according to the same test method as example 1. In this regard, the resulting mixture had a compression strength of 32 kgf/cm².

Comparative examples 1 and 2 were compared with example 1(A), and the results are described in Table 2.

TABLE 2

|         | Clay (%) | Lime (%) | ¹Slag (%) | ²Alkaline (%) | ³Strength (kgf/cm²) | Aging Time (day) |
|---------|----------|----------|-----------|---------------|---------------------|-------------------|
| Ex. 1(A) | 90 | 6 | 4 | 0.08 | 80 | 14 |
| Co. Ex. 1 | 90 | 6 | 0 | — | 45 | 14 |
| Co. Ex. 2 | 90 | 0 | 4 | 0.16 | 32 | 14 |

¹Slag: blast furnace slag
²Alkaline: alkaline chemical
³Strength: compression strength

COMPARATIVE EXAMPLE 3

80 wt % clay, 12 wt % lime, and water as a balance were mixed with each other, and aged for 14 days. The resulting mixture was tested for compression strength according to the same test method as example 1. In this regard, the resulting mixture had a compression strength of 82 kgf/cm².

COMPARATIVE EXAMPLE 4

80 wt % clay, 8 wt % blast furnace slag, 0.28 wt % alkaline chemical, and water as a balance were mixed with each other, and aged for 14 days. The resulting mixture was tested for compression strength according to the same test method as example 1. In this regard, the resulting mixture had a compression strength of 71 kgf/cm².

Comparative examples 3 and 4 were compared with example 2(D), and the results are described in Table 3.

TABLE 3

|         | Clay (%) | Lime (%) | ¹Slag (%) | ²Alkaline (%) | ³Strength (kgf/cm²) | Aging time (day) |
|---------|----------|----------|-----------|---------------|---------------------|-------------------|
| Ex. 2(D) | 80 | 12 | 8 | 0.16 | 112 | 14 |
| Co. Ex. 3 | 80 | 12 | 0 | — | 82 | 14 |
| Co. Ex. 4 | 80 | 0 | 8 | 0.28 | 71 | 14 |

¹Slag: blast furnace slag
²Alkaline: alkaline chemical
³Strength: compression strength

COMPARATIVE EXAMPLE 5

70 wt % clay, 6 wt % lime, and water as a balance were mixed with each other, and aged for 14 days. The resulting mixture was tested for compression strength according to the same test method as example 1. In this regard, the resulting mixture had a compression strength of 58 kgf/cm².

COMPARATIVE EXAMPLE 6

70 wt % clay, 24 wt % blast furnace slag, and 0.48 wt % alkaline chemical were mixed with each other, and aged for 14 days. The resulting mixture was tested for compression strength according to the same test method as example 1. In this regard, the resulting mixture had a compression strength of 162 kgf/cm².

Comparative examples 5 and 6 were compared with example 3(I), and the results are described in Table 4.

TABLE 4

|         | Clay (%) | Lime (%) | ¹Slag (%) | ²Alkaline (%) | ³Strength (kgf/cm²) | Aging time (day) |
|---------|----------|----------|-----------|---------------|---------------------|-------------------|
| Ex. 3(I) | 70 | 6 | 24 | 0.48 | 234 | 14 |
| Co. Ex. 5 | 70 | 6 | 0 | — | 58 | 14 |
| Co. Ex. 6 | 70 | 0 | 24 | 0.48 | 162 | 14 |

¹Slag: blast furnace slag
²Alkaline: alkaline chemical
³Strength: compression strength

COMPARATIVE EXAMPLE 7

60 wt % clay, 6 wt % lime, and water as a balance were mixed with each other, and aged for 14 days. The resulting mixture was tested for compression strength according to the same test method as example 1. In this regard, the resulting mixture had a compression strength of 73 kgf/cm².

COMPARATIVE EXAMPLE 8

60 wt % clay, 34 wt % blast furnace slag, and 0.68 wt % alkaline chemical were mixed with each other, and aged for 14 days. The resulting mixture was tested for compression strength according to the same test method as example 1. In this regard, the resulting mixture had a compression strength of 198 kgf/cm².

Comparative examples 7 and 8 were compared with example 4(L), and the results are described in Table 5.

TABLE 5

|         | Clay (%) | Lime (%) | ¹Slag (%) | ²Alkaline (%) | ³Strength (kgf/cm²) | Aging time (day) |
|---------|----------|----------|-----------|---------------|---------------------|-------------------|
| Ex. 4(L) | 60 | 6 | 34 | 0.44 | 312 | 14 |
| Co. Ex. 7 | 60 | 6 | 0 | — | 73 | 14 |
| Co. Ex. 8 | 60 | 0 | 34 | 0.68 | 198 | 14 |

¹Slag: blast furnace slag
²Alkaline: alkaline chemical
³Strength: compression strength

COMPARATIVE EXAMPLE 9

50 wt % clay, 8 wt % lime, and water as a balance were mixed with each other, and aged for 14 days. The resulting mixture was tested for a compression strength according to the same test method as example 1. In this regard, the resulting mixture had the compression strength of 113 kgf/cm².

COMPARATIVE EXAMPLE 10

50 wt % clay, 42 wt % blast furnace slag, and 0.84 wt % alkaline chemical were mixed with each other, and aged for 14 days. The resulting mixture was tested for compression strength according to the same test method as example 1. In this regard, the resulting mixture had a compression strength of 256 kgf/cm².

Comparative examples 9 and 10 were compared with example 5(0), and the results are described in Table 6.

TABLE 6

| | Clay (%) | Lime (%) | ¹Slag (%) | ²Alkaline (%) | ³Streng. (kgf/cm²) | Aging time (day) |
|---|---|---|---|---|---|---|
| Ex. 5(O) | 50 | 8 | 42 | 0.84 | 412 | 14 |
| Co. Ex. 9 | 50 | 8 | 0 | — | 113 | 14 |
| Co. Ex. 10 | 50 | 0 | 42 | 0.84 | 256 | 14 |

¹Slag: blast furnace slag
²Alkaline: alkaline chemical
³Streng.: compression strength From Tables 1 to 6, it can be seen that a clay composite according to the present invention mostly consists of three components. That is, the clay, lime, and blast furnace slag have better compression strength than a two-component composite mostly consisting of the clay and lime, or clay and blast furnace slag by 150 to 200%.

INDUSTRIAL APPLICABILITY

As described above, the present invention provides a clay composite having high compression strength due to an ionic coagulation reaction, a pozzolan reaction, and a latent hydraulic reaction even though clay constituting the clay composite is not calcined. Because the clay is not calcined, the process of producing the clay composite is simplified, production cost of the clay composite is reduced, and energy waste and atmospheric pollution by harmful substances are not generated.

Additionally, the clay composite is advantageous in that the clay composite used as building materials shields dwellers from harmful waves, such as electromagnetic waves, and provides amenity to the dwellers because the clay emitting useful elements and far infrared rays are used instead of cement that is harmful to humans, and the energy efficiency of buildings is secured due to the excellent insulating property of the clay.

Furthermore, the clay composite can be applied to ecological blocks, masonry materials, secondary building materials such as blocks, panels, boards, and bricks, and finishing materials, in addition to building materials.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A non-calcined clay composite, comprising 60 to 90 wt % clay, 2 to 30 wt % lime, 4 to 35 wt % blast furnace slag, 0.04 to 0.9 wt % alkaline chemical, and water as a balance.

2. The non-calcined clay composite as set forth in claim 1, wherein the alkaline chemical is selected from the group consisting of NaOH, KOH, slaked lime ($Ca(OH)_2$), $CaSO_4$, $CaCl_2$, NaCl, alum (alumstone), water glass (sodium silicate), and a mixture thereof.

* * * * *